(12) United States Patent
Lee et al.

(10) Patent No.: US 12,137,750 B2
(45) Date of Patent: Nov. 12, 2024

(54) AEROSOL GENERATING SYSTEM INCLUDING A CRADLE AND A HOLDER, AND A CRADLE THEREOF

(71) Applicant: KT&G CORPORATION, Daejeon (KR)

(72) Inventors: Seung Won Lee, Gwangmyeong-si (KR); Wang Seop Lim, Anyang-si (KR); Yong Hwan Kim, Anyang-si (KR); Sung Wook Yoon, Suwon-si (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 766 days.

(21) Appl. No.: 17/281,783

(22) PCT Filed: Dec. 16, 2020

(86) PCT No.: PCT/KR2020/018435
§ 371 (c)(1),
(2) Date: Mar. 31, 2021

(87) PCT Pub. No.: WO2021/172721
PCT Pub. Date: Sep. 2, 2021

(65) Prior Publication Data
US 2022/0395030 A1 Dec. 15, 2022

(30) Foreign Application Priority Data
Feb. 25, 2020 (KR) .......................... 10-2020-0022998

(51) Int. Cl.
*A24F 40/95* (2020.01)
*A24F 15/01* (2020.01)
(Continued)

(52) U.S. Cl.
CPC .............. *A24F 40/95* (2020.01); *A24F 15/01* (2020.01); *A24F 40/20* (2020.01); *A24F 40/53* (2020.01);
(Continued)

(58) Field of Classification Search
CPC .......... A24F 40/95; A24F 15/01; A24F 40/20; A24F 40/53; A24F 40/57; A24F 40/50;
(Continued)

(56) References Cited

U.S. PATENT DOCUMENTS

2014/0014125 A1   1/2014  Fernando et al.
2017/0258135 A1   9/2017  Yerkic-Husejnovic et al.
(Continued)

FOREIGN PATENT DOCUMENTS

CN   110114954 A   8/2019
EA   201390737 A1  9/2013
(Continued)

OTHER PUBLICATIONS

Office Action dated Apr. 28, 2023, issued in Chinese Application No. 202080006358.9.
(Continued)

*Primary Examiner* — Justin M Kratt
(74) *Attorney, Agent, or Firm* — Sughrue Mion, PLLC

(57) ABSTRACT

An aerosol generating system includes a holder including: a heater configured to heat an aerosol generating article; a holder battery configured to supply electric power to the heater; and a holder processor configured to measure a remaining charge value of the holder battery; and a cradle detachably coupled to the holder and including: a cradle battery having a greater battery capacity than the holder
(Continued)

battery; and a cradle processor configured to: identify whether the holder is coupled to the cradle, receive a remaining charge value of the holder battery from the holder processor based on the holder being coupled to the cradle, and control the cradle battery to supply electric power to the heater based on the received remaining charge value being greater than or equal to a preset reference value.

7 Claims, 14 Drawing Sheets

(51) Int. Cl.
    *A24F 40/20* (2020.01)
    *A24F 40/53* (2020.01)
    *A24F 40/57* (2020.01)
    *H02J 7/00* (2006.01)
    *H02J 7/34* (2006.01)
    *A24F 40/50* (2020.01)
    *A24F 40/90* (2020.01)

(52) U.S. Cl.
CPC ............ *A24F 40/57* (2020.01); *H02J 7/0044* (2013.01); *H02J 7/0048* (2020.01); *H02J 7/342* (2020.01); *A24F 40/50* (2020.01); *A24F 40/90* (2020.01); *H02J 7/0047* (2013.01); *H02J 7/0049* (2020.01); *H02J 2310/22* (2020.01); *Y02E 60/10* (2013.01)

(58) Field of Classification Search
CPC ....... A24F 40/90; H02J 7/0044; H02J 7/0048; H02J 7/342; H02J 7/0047; H02J 7/0049; H02J 2310/22; Y02E 60/10
See application file for complete search history.

(56) References Cited

U.S. PATENT DOCUMENTS

| | | |
|---|---|---|
| 2018/0177234 A1 | 6/2018 | Lee |
| 2020/0022407 A1 | 1/2020 | Sauder |
| 2020/0305513 A1 | 10/2020 | Fernando |
| 2020/0358304 A1* | 11/2020 | Lee .......... A24F 40/90 |
| 2020/0359681 A1 | 11/2020 | Han et al. |
| 2022/0022556 A1* | 1/2022 | Smith .............. H02J 7/342 |

FOREIGN PATENT DOCUMENTS

| | | |
|---|---|---|
| KR | 10-2018-0111460 A | 10/2018 |
| KR | 10-2019-0022498 A | 3/2019 |
| KR | 10-2019-0105884 A | 9/2019 |
| KR | 10-2019-0135759 A | 12/2019 |
| KR | 10-2020-0004691 A | 1/2020 |
| WO | 2019/156382 A1 | 8/2019 |
| WO | WO-2020009405 A1 * | 1/2020 ............. A24F 40/40 |

OTHER PUBLICATIONS

Office Action dated Dec. 5, 2022 from the Russian Patent Office in Application No. 2021110879/03.
Internal Search Report dated Mar. 24, 2021 in Application No. PCT/KR2020/018435.

* cited by examiner

AEROSOL GENERATING SYSTEM INCLUDING A CRADLE AND A HOLDER, AND A CRADLE THEREOF

An aerosol generating system including a cradle and a holder, and a cradle thereof

CROSS REFERENCE TO RELATED APPLICATIONS

This application is a National Stage of International Application No. PCT/KR2020/018435 filed Dec. 16, 2020, claiming priority based on Korean Patent Application No. 10-2020-0022998 filed Feb. 25, 2020.

TECHNICAL FIELD

One or more embodiments of the present disclosure relate to an aerosol generating system including a cradle and a holder, and a cradle thereof, and more particularly, to a method of generating an aerosol from an aerosol generating system including a cradle and a holder that are detachably coupled to each other.

BACKGROUND ART

Recently, the demand for alternatives to traditional cigarettes has increased. For example, there is growing demand for an aerosol generating device which generates an aerosol by heating an aerosol generating material in cigarettes, rather than by combusting cigarettes. Accordingly, research into a heating-type cigarette and a heating-type aerosol generator has been actively conducted.

As the number of users using a heating-type aerosol generating device has increased, so has the number of devices reflecting various needs of such users. As an example, some aerosol generating devices change the temperature profile of a heater within a certain range to provide a user with a different smoking sensation. Also, a heater included in aerosol generating devices may have various shapes and/or may be made of various materials such that a unique temperature profile is created.

DISCLOSURE

Technical Problem

One or more embodiments of the present disclosure provide a method of efficiently using a battery of an aerosol generating device.

Technical Solution

According to an aspect of the present disclosure, a cradle to which a holder generating an aerosol is detachably attached, may include: a cradle battery configured to supply electric power to a heater or a battery of the holder; and a cradle processor configured to: identify whether the holder is coupled to the cradle; receive a remaining charge value of the battery of the holder from the holder based on the holder being coupled to the cradle, and control the cradle battery to supply electric power to the heater based on the received remaining charge value being greater than or equal to a preset reference value.

According to another aspect of the present disclosure, an aerosol generating system may include: a holder including: a heater configured to heat an aerosol generating article; a holder battery configured to supply electric power to the heater; and a holder processor configured to measure a remaining charge value of the holder battery; and a cradle detachably coupled to the holder and comprising: a cradle battery having a greater battery capacity than the holder battery; and a cradle processor configured to: identify whether the holder is coupled to the cradle, receive a remaining charge value of the holder battery from the holder processor based on the holder being coupled to the cradle, and control the cradle battery to supply electric power to the heater based on the received remaining charge value being greater than or equal to a preset reference value.

Advantageous Effects

According to one or more embodiments of the present disclosure, in an aerosol generating system including a cradle and a holder, it is possible to efficiently use a battery of the holder.

In addition, according to one or more embodiments of the present disclosure, it is possible to reduce the size of the battery of the holder, so that the holder may be miniaturized.

BEST MODE

Figure 1:
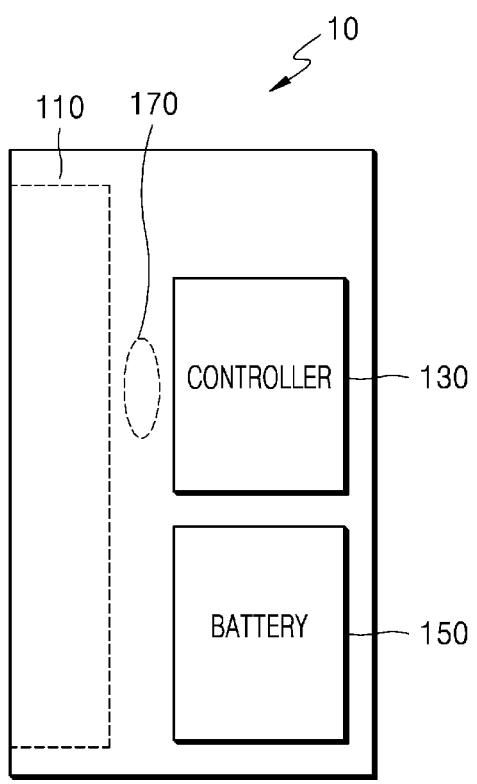
FIG. 1 is a schematic block diagram illustrating a cradle according to an embodiment.

According to an aspect of the present disclosure, a cradle to which a holder generating an aerosol is detachably attached, may include: a cradle battery configured to supply electric power to a heater or a battery of the holder; and a cradle processor configured to: identify whether the holder is coupled to the cradle; receive a remaining charge value of the battery of the holder from the holder based on the holder being coupled to the cradle, and control the cradle battery to supply electric power to the heater based on the received remaining charge value being greater than or equal to a preset reference value.

The cradle processor may receive the remaining charge value further based on whether an aerosol generating article is inserted into the holder.

The cradle processor within the cradle may control the cradle battery to supply electric power to the holder battery when the received remaining charge value is less than the reference value.

The cradle processor within the cradle may receive a temperature value of the heater from the holder.

The cradle processor within the cradle may separate the holder from the cradle when the received temperature value is greater than or equal to a preset reference temperature value.

According to another aspect of the present disclosure, an aerosol generating system may include: a holder including: a heater configured to heat an aerosol generating article; a holder battery configured to supply electric power to the heater; and a holder processor configured to measure a remaining charge value of the holder battery; and a cradle detachably coupled to the holder and comprising: a cradle battery having a greater battery capacity than the holder battery; and a cradle processor configured to: identify whether the holder is coupled to the cradle, receive a remaining charge value of the holder battery from the holder processor based on the holder being coupled to the cradle, and control the cradle battery to supply electric power to the heater based on the received remaining charge value being greater than or equal to a preset reference value.

The cradle processor may receive the remaining charge value further based on whether an aerosol generating article is inserted into the holder.

The cradle processor within the system may control the cradle battery to supply electric power to the holder battery when the received remaining charge value is less than the reference value.

The cradle processor within the system may receive a temperature value of the heater from holder processor.

The cradle processor within the system may separate the holder from the cradle when the received temperature value is greater than or equal to a preset reference temperature value.

The holder processor within the system may control the holder battery to supply electric power to the heater when the holder is separated from the cradle.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, there are terms arbitrarily selected by the applicant in the specification, and the meaning of the terms will be described in detail. Therefore, the terms used in the present invention should be defined based on the meaning of the term and the overall contents of the present invention, not a simple name of the term.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

FIG. 1 is a schematic block diagram illustrating a cradle according to an embodiment.

Referring to FIG. 1, a cradle 10 includes a holder mounting portion 110, a controller 130, a battery 150, and a separation controller 170. It will be apparent to those skilled in the art that FIG. 1 illustrates only some components of the cradle 10 for convenience of description, and additional components may be added without departing from the scope of the present disclosure. In addition, the internal structure of the cradle 10 of the aerosol generating system is not limited to that shown in FIG. 1, and according to embodiments or design, the arrangement of the holder mounting portion 110, the controller 130, the battery 150, and the separation controller 170 may be different from that of FIG. 1.

The holder mounting portion 110 refers to a space or structure that allows a holder to be mounted on the cradle 10. FIG. 1 shows that the holder mounting portion 110 is inside the cradle 10 in FIG. 1, but depending on embodiments, the holder mounting portion 110 may be located on the outside of the cradle 10, which will be described later with reference to FIG. 5. In addition, the holder to be coupled to the holder mounting portion 110 will be described in detail with reference to FIGS. 2 and 3.

The controller 130 may be a micro-controller unit (MCU) that controls the overall operation of the cradle 10 through a control signal. More specifically, the controller 130 controls the operation of the battery 150 as well as the operation of other components included in the cradle 10. In addition, the controller 130 may check states of each of the components included in the cradle 10 to determine whether the cradle 10 is in an operable state or not.

The controller 130 may include at least one processor. A processor can be implemented as an array of a plurality of logic gates or can be implemented as a combination of a general-purpose microprocessor and a memory in which a program executable in the microprocessor is stored. In addition, it will be understood by those of ordinary skill in the art that the controller 130 may be implemented in a type of hardware different from the above-described type.

The battery 150 may supply electric power needed for the cradle 10 to operate, and may receive a control signal from the controller 130 to supply electric power to the holder as well as to the cradle 10. More specifically, the battery 150 may supply electric power used for the controller 130 of the cradle 10 to generate a control signal and perform a necessary calculation, charge a battery of the holder, or supply electric power to a heater of the holder to heat the heater of the holder. In order for the battery 150 of the cradle 10 to charge the battery of the holder or supply electric power to the heater of the holder, the holder needs to be coupled to the holder mounting portion 110 and the controller 130 needs to be aware of that. In addition, the battery 150 may supply electric power needed for a display, a sensor, a motor, etc. installed in the cradle 10 to operate.

The separation controller 170 electrically and/or mechanically separates the holder from the holder mounting portion 110, according to the control signal from the controller 130. The separation controller 170 is located between the holder coupled to the holder mounting portion 110 and the controller 130. The separation controller 170 may include a sensor to determine whether the holder is coupled to the holder mounting portion 110 or not.

Here, when the holder is electrically and/or mechanically separated from the holder mounting portion 110, a portion of the holder may protrude to the outside of the cradle 10 so that a user may easily hold the holder from the cradle 10. Alternatively, the physical force required to detach the holder from the cradle 10 may be reduced even though the position of the holder has not changed when the user observes with the naked eye.

Figure 2:
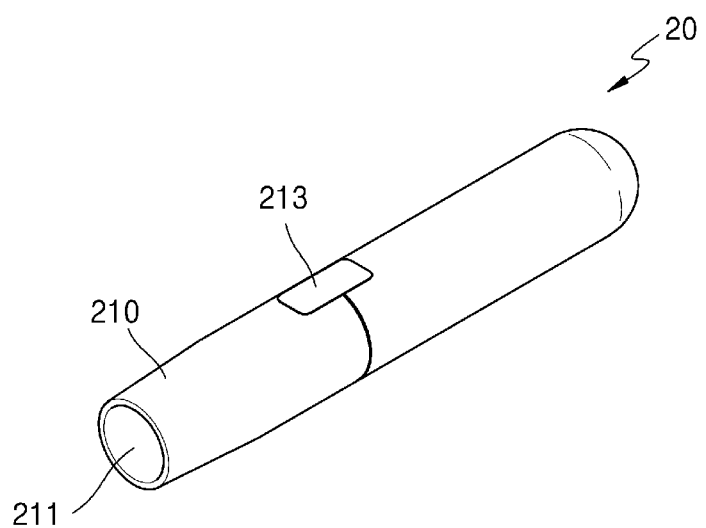
FIG. 2 is a schematic perspective view of a holder according to an embodiment.

FIG. 2 is a schematic perspective view of a holder according to an embodiment.

As shown in FIG. 2, a holder 20 may be manufactured in a cylindrical shape. However, embodiments of the present disclosure are not limited thereto. A housing 210 of the holder 20 may be moved or separated by a user's motion, and a cigarette (i.e., an aerosol generating article including an aerosol generating material) may be inserted into an end 211 of the housing 210. In addition, the holder 20 may include a button 213 through which the user may control the holder 20. In addition, although not shown in FIG. 2, the holder 20 may further include a display on which an image is output, depending on embodiments.

Figure 3:
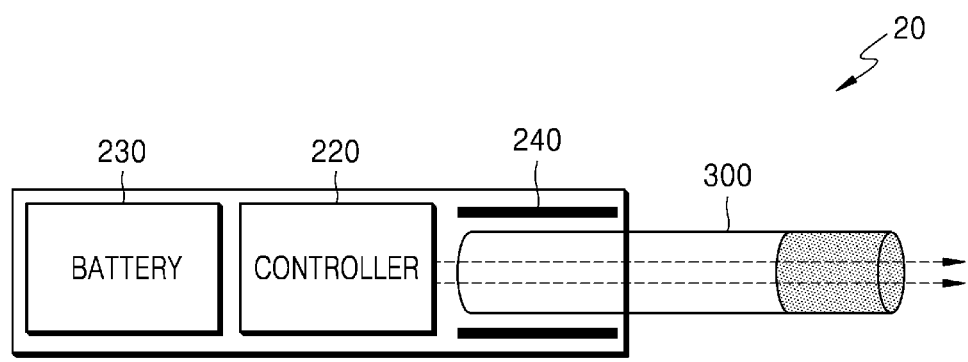
FIG. 3 is a diagram illustrating an embodiment in which a cigarette is inserted into a holder.

FIG. 3 is a diagram illustrating an embodiment in which a cigarette 300 is inserted into a holder 20.

Referring to FIG. 3, the holder 20 includes a controller 220, a battery 230, and a heater 240. A double medium cigarette 300 may be inserted into the holder 20, as an example of an aerosol generating article including an aerosol generating material that generates an aerosol when heated.

First, the controller 220 of the holder 20 controls the overall operation of the holder 20. More specifically, the controller 220 of the holder 20 controls the operation of other components included in the holder 20 as well as the operation of the battery 230 and the heater 240 of the holder 20 through a control signal. In addition, the controller 220 may check states of each of the components of the holder 20 to determine whether or not the holder 20 is in an operable state.

The controller 220 of the holder 20 may include at least one processor. A processor can be implemented as an array of a plurality of logic gates or can be implemented as a combination of a general-purpose microprocessor and a memory in which a program executable in the microprocessor is stored. Moreover, it may be understood by those of ordinary skill in the art to which the present embodiment belongs that the controller 220 of the holder 20 may be implemented in a type of hardware different from that shown in FIG. 3. According to one or more embodiments of the present disclosure, in order to clearly distinguish the controller 130 of the cradle 10 and the controller 220 of the holder 20, the controller 130 of the cradle 10 and the controller 220 of the holder 20 may be referred to as a cradle processor and a holder processor, respectively.

The battery 230 may supply electric power needed for the holder 20 to operate, and may be charged by the battery 150 of the cradle 10. More specifically, when the holder 20 is coupled to the holder mounting portion 110 of the cradle 10 such that the holder 20 and the cradle 10 are electrically coupled to each other, if the controller 220 detects that the battery 230 of the holder 20 is not sufficiently charged with reference to a reference value, the controller 130 of the cradle 10 may perform a voltage change through a software and apply an output voltage (e.g., 5V) to a charging module of the holder 20 through a direct current (DC)-DC converter in order to charge the battery 230 of the holder 20. In FIGS. 1 and 3, a software module, a DC-DC converter, and a charging module to perform a voltage change are omitted for convenience of illustration.

The heater 240 may be heated by electric power supplied from the battery 230. For example, when a cigarette 300 is inserted into the holder 20, the heater 240 may be located outside the cigarette 300. Therefore, the heated heater 240 may raise the temperature of an aerosol generating material in the cigarette.

The heater 240 may be an electric resistive heater. For example, the heater 240 may include an electrically conductive track, and the heater 240 may be heated as electric current flows through the electrically conductive track. However, the heater 240 is not limited to the above-described example, and may be applied without limitation as long as it may be heated to a preset target temperature. Here, the target temperature may be preset in the holder 20 or may be set to a desired temperature by a user.

As another example, the heater 240 may be an induction heating-type heater. More specifically, the heater 240 may include an electrically conductive coil to heat the cigarette 300 by an induction heating method, and the cigarette 300 may include a susceptor that may be heated by an induction heating-type heater. For example, the heater 240 may include a tubular heating element, a plate-shaped heating element, a needle-shaped heating element, or a rod-shaped heating element, and may heat the inside or outside of the cigarette 300, depending on the shape of a heating element.

In addition, a plurality of heaters 240 may be disposed on the holder 20. In that case, the plurality of heaters 240 may be disposed outside the cigarette 300. The shape of the heater 240 is not limited to the shape shown in FIG. 3, and may be manufactured in various shapes.

Figure 4A:
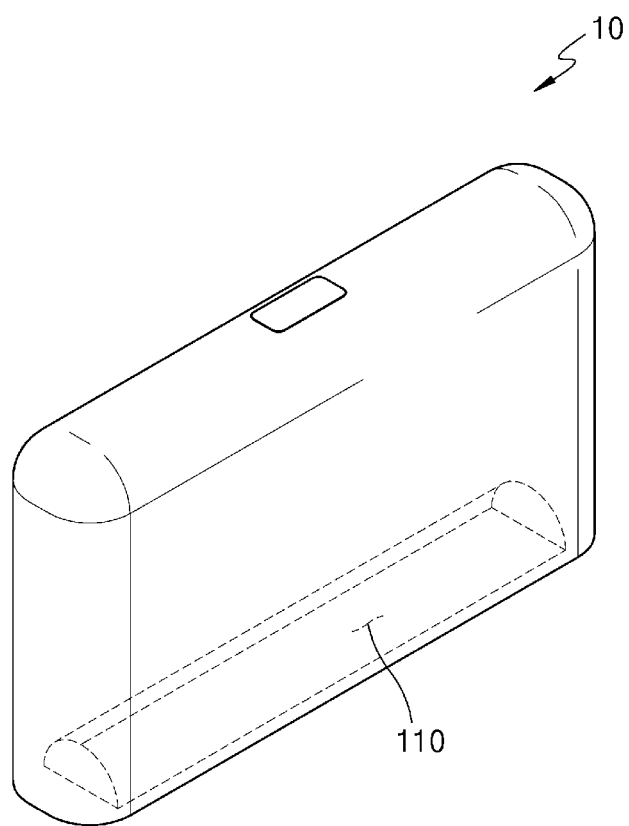
FIG. 4A is a diagram illustrating an embodiment of a cradle.

FIG. 4A is a diagram illustrating a holder coupled to a cradle, according to an embodiment.

The cradle 10 without a lid is illustrated in FIG. 4A. For example, as aforementioned with reference to FIG. 1, the holder 20 may be inserted into the holder mounting portion 110 (e.g., a cavity) formed on one side of the cradle 10.

Figure 4B:
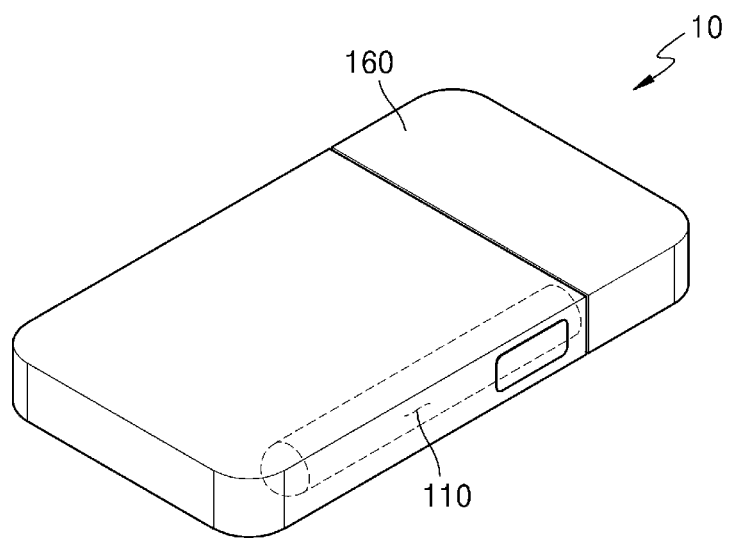
FIG. 4B is a diagram illustrating another embodiment of a cradle.

FIG. 4B is a diagram illustrating a holder coupled to a cradle, according to another embodiment.

The cradle 10 with a lid is illustrated in FIG. 4B. For example, the holder 20 described in FIG. 2 is inserted into the holder mounting portion 110 of the cradle 10, and the holder 20 may be fixed to the cradle 10 as a lid 160 is closed.

Figure 4C:
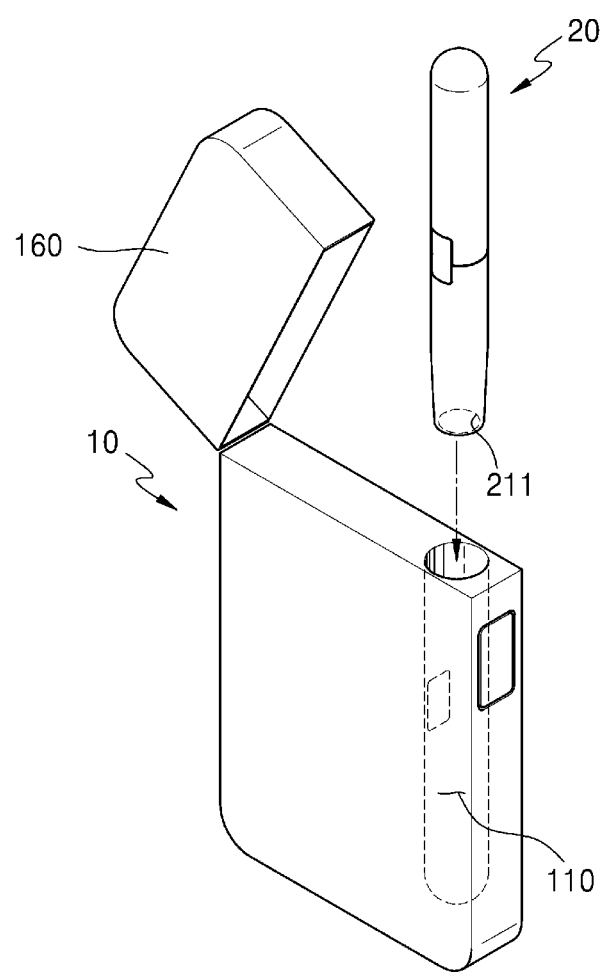
FIG. 4C is a diagram illustrating a process in which a holder is coupled to a cradle.

FIG. 4C is a diagram illustrating how a holder is coupled to a cradle.

As shown in FIG. 4C, the holder 20 may be coupled to the holder mounting portion 110 of the cradle 10 with the end 211 of the holder 20 facing the bottom of the holder mounting portion 110 of the cradle 10. Accordingly, the heater 240 of the holder 20 may also be disposed in the holder mounting portion 110 of the cradle 10. When the lid 160 of the cradle 10 is closed after the holder 20 is inserted into the cradle 10, the holder 20 is fixed inside the cradle 10.

Figure 5:
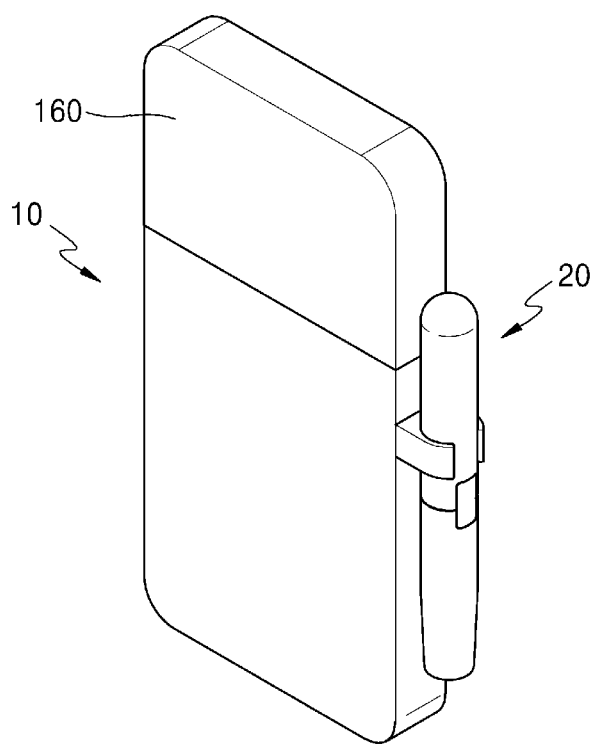
FIG. 5 is a diagram illustrating an embodiment of a holder coupled to a cradle.

FIG. 5 is a diagram illustrating a holder coupled to a cradle, according to another embodiment.

As shown in FIG. 5, the holder 20 may be coupled to the cradle 10 by being coupled to the holder mounting portion 110 provided on one side of the cradle 10. Unlike the embodiment described in FIGS. 4A to 4C, according to the embodiment shown in FIG. 5, even when the holder 20 is coupled to the outside of the cradle 10, the holder 20 may be charged through the battery 150 of the cradle 10. Also, a user may easily remove the holder 20 that has been fully charged without opening the lid 160 of the cradle 10. As described in FIG. 1, the separation controller 170 is connected to the holder mounting portion 110. When the user removes the holder 20 from the holder mounting portion 110, the separation controller 170 may control the holder 20 to be detached with a minimum physical force.

Figure 6A:
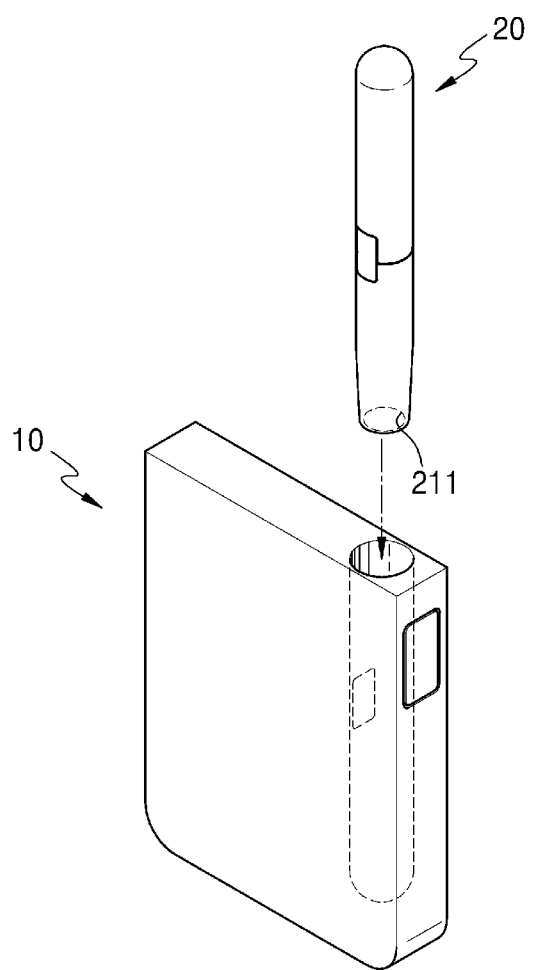
FIG. 6A is a diagram illustrating another embodiment of a holder coupled to a cradle.

FIG. 6A is a diagram illustrating show a holder is coupled to a cradle, according to another embodiment.

As shown in FIG. 6A, the holder 20 may be coupled to the holder mounting portion 110 of the cradle 10 with the end 211 of the holder 20 facing the bottom of the holder mounting portion 110 of the cradle 10. The cradle 10 in FIG. 6A is distinguished from the cradle 10 in FIG. 4C in that the cradle 10 in FIG. 6A does not have the lid 160. Accordingly, it is not necessary to open the lid 160 of the cradle 10 in FIG. 6A to mount the holder 20 on the cradle 10 or to couple the holder 20 to the cradle 10.

Figure 6B:
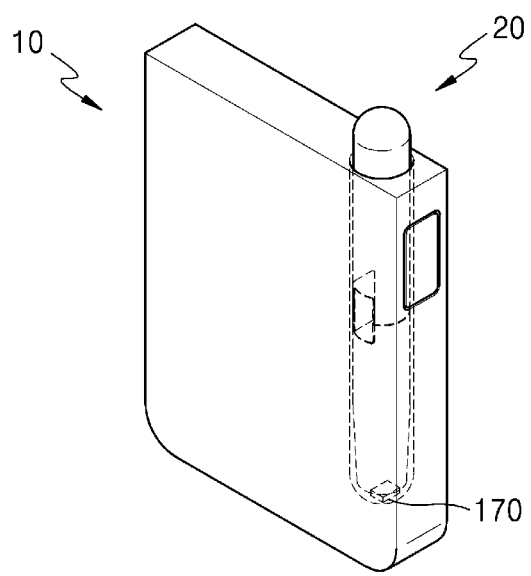
FIG. 6B is a diagram illustrating another embodiment of a holder coupled to a cradle.

FIG. 6B is a diagram illustrating a holder coupled to a cradle, according to another embodiment.

In FIG. 6B, the holder 20 is coupled to the cradle 10. The holder 20 may be electrically and/or mechanically separated from the cradle 10 by the separation controller 170 of the cradle 10. In order for a user to easily remove the holder 20 from the cradle 10, all or part of the holder 20 may be exposed to the outside of the cradle 10, as shown in FIG. 6B.

Figure 7:
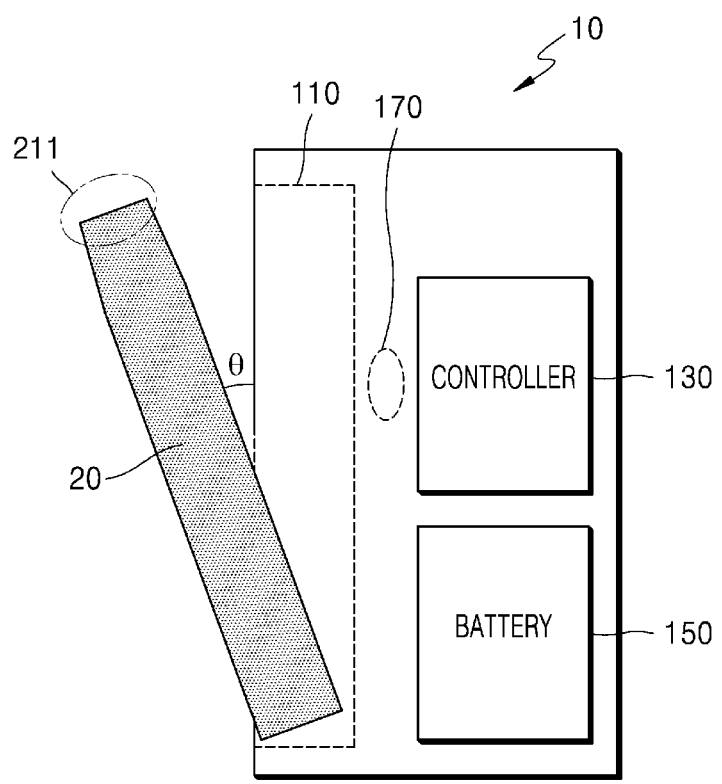
FIG. 7 is a diagram illustrating an embodiment of a holder tilted while being inserted into a cradle.

FIG. 7 is a diagram illustrating a holder coupled to a cradle, according to another embodiment.

Referring to FIG. 7, the holder 20 is tilted inside the cradle 10. Here, "tilt" refers to a state in which the holder 20 is inclined at a certain angle while still being coupled to the holder mounting portion 110 of the cradle 10, such that the end 211 of the holder 20 is exposed to the outside of the cradle 10.

A tilt angle θ may be set in advance so that the cigarette 300 is not bent or damaged when the cigarette 300 is inserted into the end 211 of the holder 20. For example, the tile angle θ may be set to a minimum angle that exposes a cigarette insertion hole of the end 211 to the outside. For example, the tilt angle θ may be in the range of 0° to 180°. Preferably, the tilt angle may be 10°.

Even when the holder 20 is tilted, the holder 20 and the cradle 10 are coupled to each other. Therefore, the heater 240 of the holder 20 may be heated by electric power supplied by the battery 150 of the cradle 10.

The separation controller 170 may electrically and/or mechanically couple or decouple the holder 20 with the cradle 10 under certain conditions. For convenience of description, in FIG. 7, the separation controller 170 is located between the holder 20 and the controller 130 of the cradle 10. However, depending on embodiments, the separation controller 170 may be located at various positions within the cradle 10 and may have various shapes.

According to one or more embodiments of the present disclosure, a user may insert the cigarette 300 into the end 211 of the holder 20 exposed to the outside of the cradle 10. When the cigarette 300 is inserted into the end 211 of the holder 20, the controller 220 of the holder 20 determines whether the holder 20 is normally coupled to the cradle 10 and whether the battery 230 of the holder 20 is charged as much as a preset reference value or more. Following that, the controller 220 of the holder 20 supplies electric power to the heater 240 of the holder 20 from the battery 150 of the cradle 10 to preheat the heater 240. When the preheating of the heater 240 is completed, the separation controller 170 of the cradle 10 receives a control signal from the controller 130 and electrically and/or mechanically separates the holder 20 from the cradle 10, such that the user may enjoy smoking through the separated holder 20.

Figure 8:
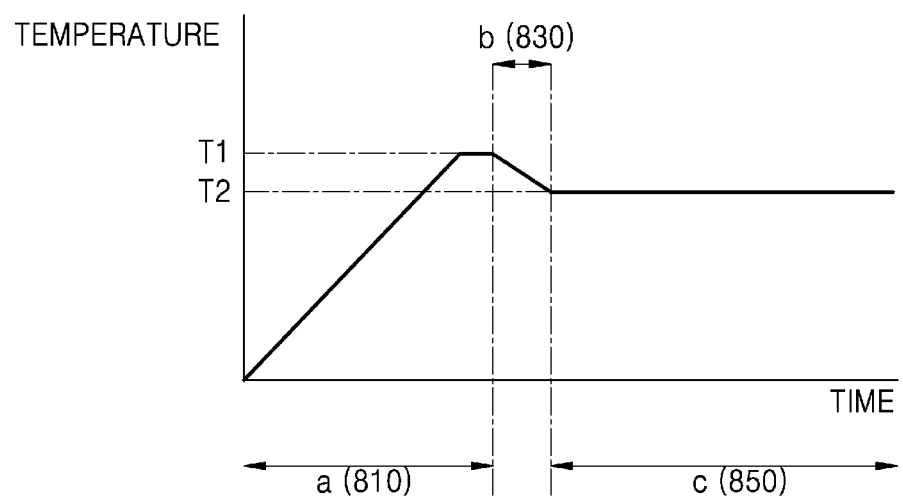
FIG. 8 is a graph illustrating variations in temperature of a heater of a holder according to an embodiment.

FIG. 8 is a graph illustrating variations in temperature of a heater of a holder, according to an embodiment.

In the graph of FIG. 8, the horizontal axis represents time, and the vertical axis represents Celsius temperature. The heater 240 of the holder 20 receives electric power from the battery 150 of the cradle 10 to be preheated, and the temperature rises to a preheating temperature $T_1$, in section a 810.

When the controller 130 of the cradle 10 detects that the temperature of the heater 240 of the holder 20 has risen to the preheating temperature, the controller 130 of the cradle 10 controls the holder 20 to be electrically and/or mechanically separated from the cradle 10 through the separation controller 170.

Section b 830 in FIG. 8 refers to a section in which the heater 240 of the holder 20 is cooled while holder 20 is electrically and/or mechanically separated from the cradle 10, so that the temperature of the heater 240 falls to a maintenance temperature $T_2$ lower than the preheating temperature $T_1$.

When the controller 220 of the holder 20 detects that the holder 20 is separated from the cradle 10, the controller 220 of the holder 20 controls the temperature of the heater 240 such that an aerosol is generated while maintaining the temperature of the heater 240 at the maintenance temperature $T_2$ in section c 850 through the battery 230 of the holder 20. Here, in order for the controller 220 of the holder 20 to maintain the maintenance temperature $T_2$ by using the electric power of the battery 230 of the holder 20, the temperature of the heater 240 needs to be within a certain range from the preheating temperature $T_1$.

Figure 9:
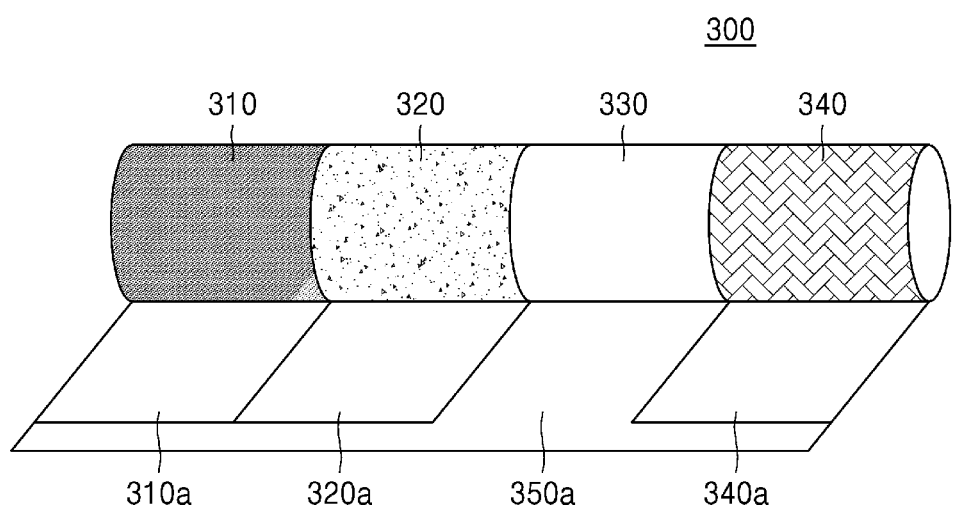
FIG. 9 is a diagram illustrating an embodiment of a cigarette.

FIG. 9 is a diagram illustrating a cigarette according to an embodiment.

The cigarette 300 accommodated in the holder 20 according to one or more embodiments of the present disclosure may be referred to as an aerosol generating article including at least one aerosol generating material. The cigarette may include a plurality of segments. The segments may include different aerosol generating materials.

Referring to FIG. 9, the cigarette 300 includes a first segment 310 and a second segment 320, and different aerosol generating materials are included in the segments 310 and 320. For example, only the first and second segments 310 and 320 may include an aerosol generating material, and third and fourth segments 330 and 340 may include materials that do not generate an aerosol. However, since embodiments of the present disclosure do not limit the number of types of aerosol generating materials to a specific number, the number of segments including an aerosol generating material may be three or more, depending on embodiments.

The first segment 310 of the cigarette 300 may include a first aerosol generating material that provides a user with a first smoking sensation. As an example, the first segment 310 of the cigarette 300 may include at least one of glycerin, propylene glycol, ethylene glycol, dipropylene glycol, diethylene glycol, triethylene glycol, tetraethylene glycol, and oleyl alcohol. However, embodiments of the present disclosure are not limited thereto. For example, the aerosol generating material included in the first segment 310 may serve to increase the migration amount of glycerin, thereby increasing the user's smoking satisfaction.

The second segment 320 of the cigarette 300 may include a second aerosol generating material that provides the user with a second smoking sensation. As an example, the second segment 320 of the cigarette 300 may include a material including nicotine, such as tobacco. The tobacco included in the second segment 320 may include an ordinary cut filler manufactured in the form of a sheet or strand. The aerosol generating material included in the second segment 320 may serve to increase the migration amount of nicotine, thereby increasing the user's smoking satisfaction.

According to one or more embodiments of the present disclosure, the first segment 310 and the second segment 320 are heated by the heater 240, and the aerosol generating materials included in the first segment 310 and the second segment 320 may form a first gas and a second gas, respectively.

The first gas and the second gas are mixed to finally become an aerosol that the user inhales. The vaporization temperature of the first material included in the first segment 310 may be higher than a vaporization temperature of the second material included in the second segment 320. In this case, the depth of a cigarette insertion hole may be formed such that the first segment 310 is heated by the heater 240 and the second segment 320 is partially heated or indirectly heated by the heated first segment 310. The second segment 320 may serve as a filter to reduce the first gas generated from the first segment 310 to an appropriate amount, thereby providing the user with a smooth smoking sensation.

The first segment 310 and the second segment 320 may be surrounded by the first segment wrapper 310a and second segment wrapper 320a, as shown in FIG. 3. A specific design or pattern that may be detected by a cigarette recognition sensor of the holder 20 may be engraved on outer surfaces of the first and second segment wrappers 310a and 320a. In addition, depending on embodiments, the first and second segment wrappers 310a and 320a may be additionally surrounded by aluminum foil paper.

The third segment 330 of the cigarette 300 may be a cooling portion that cools the aerosol generated from the first segment 310 and the second segment 320 to an appropriate temperature such that the user may easily inhale the aerosol. As an example, the third segment 330 may be made of cellulose acetate tow, and may be a tube-shaped structure including a hollow therein.

The fourth segment 340 of the cigarette 300 may be a filter portion. The fourth segment 340 may be manufactured by adding a plasticizer to the cellulose acetate tow. In addition, the fourth segment 340 may be manufactured to generate flavor. As an example, a flavoring liquid may be sprayed into the fourth segment 340. Alternatively, a separate fiber coated with the flavoring liquid may be inserted into the fourth segment 340.

In an embodiment, the fourth segment 340 may include at least one capsule formed by a liquid containing perfume wrapped by a film. The capsule may have a spherical or cylindrical shape, and may be destroyed by applying a certain pressure or more by the user before smoking or in the middle of smoking, thereby allowing the user to inhale the flavored aerosol. The fourth segment 340 may also be surrounded by a wrapper like the first and second segments 310 and 320. For example, poly lactic acid (PLA) laminated paper may be used as a fourth segment wrapper 340a.

The cigarette 300 may further include an outer shell 350a to surround all of the first segment 310 to fourth segment 340. The outer shell 350a may be made of a material having high thermal conductivity such that the thermal energy of the heater 240 is more efficiently transferred to the cigarette 300.

Figure 10:
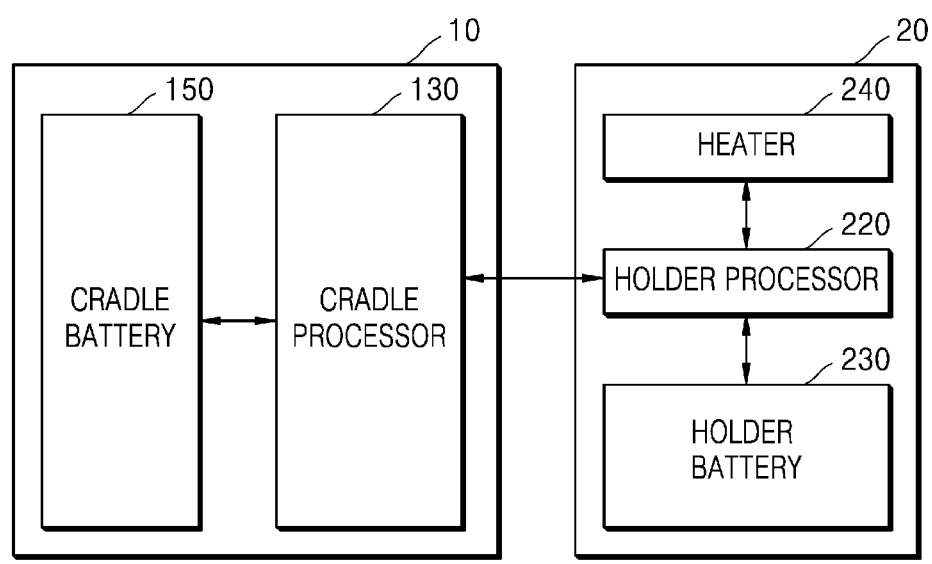
FIG. 10 is a block diagram illustrating an embodiment of a holder and a cradle.

FIG. 10 is a block diagram illustrating a holder and a cradle, according to an embodiment.

FIG. 10 schematically shows a data flow between a cradle processor and a holder processor while a holder is coupled to a cradle, and for convenience of description, only some components included in the cradle 10 and the holder 20 are shown.

The cradle processor 130 determines whether or not the holder 20 is coupled to the cradle 10. Determining that the holder 20 is coupled to the cradle 10, the cradle processor 130 receives a remaining charge value of the holder battery 230 from the holder processor 220.

When the remaining charge value of the holder battery 230 received from the holder processor 220 is greater than or equal to a preset reference value, and an aerosol generating article is inserted into the holder 20, the cradle processor 130 controls the cradle battery 150 to supply electric power to the heater 240. On the other hand, even when the aerosol generating article is inserted into the holder 20, if the remaining charge value of the holder battery 230 received from the holder processor 220 is less than the reference value, the cradle processor 130 may control the heater 240 not to be supplied with electric power and control the holder battery 230 to be charged by the cradle battery 150.

The cradle processor 130 receives a temperature value of the heater 240 from the holder processor 220, and separates the holder 20 from the cradle 10 when the temperature of the heater 240 is greater than or equal to a preset reference temperature value. In that process, the reference temperature value may be the preheating temperature $T_1$ described in FIG. 8.

When the holder 20 is separated from the cradle 10, the holder processor 220 controls the holder battery 230 to supply electric power to the heater 240, thereby maintaining the temperature of the heater 240 at a constant temperature. In that case, a maintenance temperature of the heater 240 may be the maintenance temperature $T_2$ described in FIG. 8.

Figure 11:
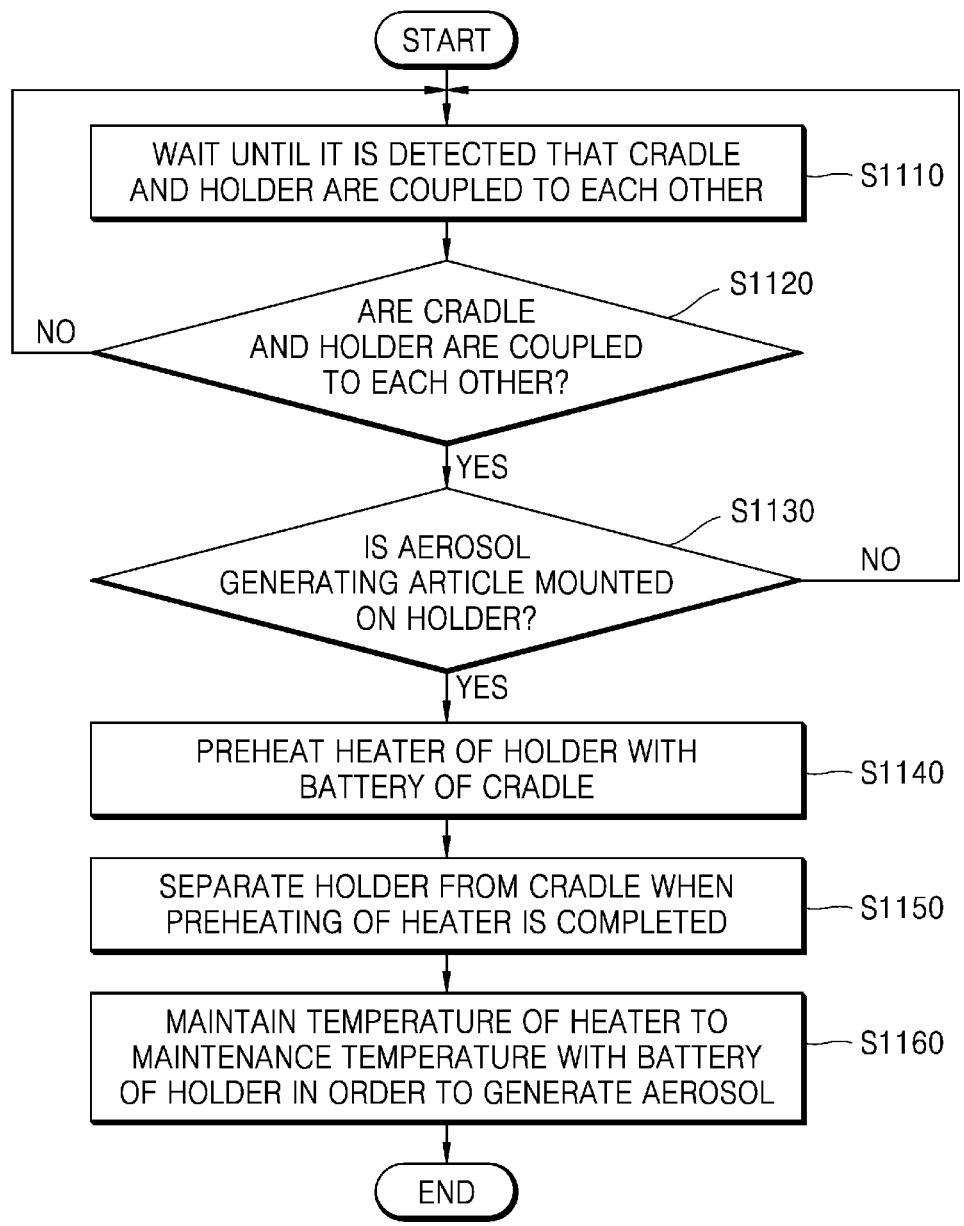
FIG. 11 is a flowchart of a method of generating an aerosol according to an embodiment.

FIG. 11 is a flowchart of a method of generating an aerosol according to an embodiment of the present disclosure.

The method according to FIG. 11 may be implemented by an aerosol generating system including the cradle 10 and the holder 20 described in FIGS. 1 to 6B, and hereinafter description will be given with reference to FIG. 10.

The cradle processor 130 waits until the coupling of the cradle 10 and the holder 20 is detected in operation S1110, and when the coupling of the cradle 10 and the holder 20 is detected in operation S1120, the cradle processor 130 determines whether or not an aerosol generating article is coupled to the holder 20 in operation S1130.

When the cradle 10 and the holder 20 are not coupled to each other, or the aerosol generating article is not coupled to the holder 20, the cradle processor 130 switches an operation mode of the cradle 10 back to a standby mode and waits until the aerosol generating article is mounted on the holder 20 and the cradle 10 and the holder 20 are coupled to each other. In addition, even when the cradle 10 and the holder 20 are coupled to each other and the aerosol generating article is mounted on the holder 20, if the holder battery 230 is not charged as much as a reference value or more, the cradle processor 130 may control the holder battery 230 to be charged as much as the reference value or more by the cradle battery 150.

Accordingly, the battery 230 may be prevented from being exhausted in the middle of smoking.

According to an embodiment, when the holder battery 230 is charged enough for the user to smoke through the cigarette 300 one time or more, the holder processor 220 may determine that the holder battery 230 is charged as much as the reference value or more. Here, 'smoke one time or more' may refer to a total time for which the temperature of the heater is raised to the preheating temperature $T_1$ and then maintained at the maintenance temperature $T_2$ (i.e., the sections a through c in FIG. 8), or may only refer to a time for which the temperature of the heater is maintained at the maintenance temperature $T_2$ in a preheated state (the section c in FIG. 8).

In particular, the holder 20 according to one or more embodiments of the present disclosure may be provided with a display capable of visually outputting a message or the like in order to improve user convenience. In a case where the cigarette 300 using a double medium is heated by a non-contact external heating method, the consumption speed of the holder battery 230 is high. Therefore, the holder battery 230 needs to be charged as much as the reference value or more so that the aerosol may be stably generated until the user finishes smoking through the holder 20. Moreover, by including the holder battery 230 with a small capacity, the overall size of the holder 20 may be reduced, thereby increasing the portability of the holder 20.

When it is confirmed that the holder battery 230 is charged as much as the reference value or more, the cradle processor 130 starts to preheat the heater 240 of the holder 20 through the cradle battery 150 in operation S1140. The temperature of the heater 240 rises to a preset preheating temperature in operation S1140. The point at which temperature rise of the heater 240 stops has already been described in the description of the graph of FIG. 8.

When the preheating of the heater 240 is completed, the cradle processor 130 electrically and/or mechanically separates the holder 20 from the cradle 10, in operation S1150. According to an embodiment, in operation S1150, the cradle processor 130 may separate the holder 20 from the cradle 10, and then, provide the user with any one of visual, audible, and tactile notification messages through various output devices provided in the cradle 10.

In operation S1160, when the user removes the holder 20 from the cradle 10, the controller 220 of the holder 20 controls the temperature of the heater 240 to be maintained at the maintenance temperature lower than the preheating temperature, such that an aerosol is stably generated while maintaining the temperature of the heater 240. In operation S1160, the holder processor 220 may utilize proportional integral derivative (PID) control to maintain the temperature of the heater 240. Also, in order to maintain atomization of the aerosol generated from the holder 20 or the smoking sensation felt by the user uniformly, the maintenance temperature may be regulated within a certain range, during the smoking time.

According to one or more embodiments of the present disclosure, since electric power of the holder battery 230 is not used in the process of preheating the heater 240 of the holder 20, even when the battery capacity of the holder 20 is configured to be small, the aerosol may be stably generated from the holder 20 while the user smokes. In addition, when the battery capacity of the holder 20 is not configured as a small capacity, continuous smoking may be possible, and various functions may be added to the holder 20.

Moreover, since the capacity of a battery is generally proportional to the size of the battery, according to one or more embodiments of the present disclosure, the capacity of the battery 230 of the holder 20 may be reduced. As a result, the holder 20 may be made even slimmer so that the user may hold the holder 20 and use the same without any difficulties.

The cigarette 300 according to one or more embodiments of the present disclosure may be a double-medium cigarette capable of providing a deep flavor to the user. In this case, in order to effectively heat the cigarette 300, the heater 240, which has improved in terms of shape and material in various ways, needs to be used. However, such heater 240 may accelerate the power consumption of the battery 230 of the holder 20. Under such circumstances, when electric power of the battery 150 of the cradle 10 is used to preheat the heater 240 of the holder 20 in a preheating section according to one or more embodiments of the present disclosure, there is also an advantage that the user may use the battery 230 of the holder 20 only in a section (e.g., a maintenance section) in which the user substantially inhales the aerosol by using the holder 20.

Further, according to one or more embodiments of the present disclosure, the performance and life of the battery 230 of the holder 20 may be increased. In general, an output voltage of the battery 230 used in the holder 20 is 4.2 V, and as electric power is consumed and as charging and discharging are repeated, an end of discharge voltage of the battery 230 drops to about 3.5 V. In this case, a maximum current supplied to the holder 20 increases, making it impossible to generate an aerosol that may provide satisfaction to the user. However, according to one or more embodiments of the present disclosure, by not using the battery 230 of the holder 20 excessively, the power consumption and the maximum current of the holder 20 may be reduced, and the performance of the battery 230 of the holder 20 may be maintained for a long time.

The embodiments of the present disclosure may be implemented in the form of a computer program which may be executed on a computer via various types of components, and such a computer program may be recorded on a computer-readable recording medium. The medium may include a magnetic medium such as a hard disk, a floppy disk, and a magnetic tape, an optical recording medium such as CD-ROM and DVD, a magneto-optical medium such as a floptical disk, and a hardware device specifically configured to store and execute program instructions, such as ROM, RAM, and flash memory.

The computer program is specifically designed and configured for the present disclosure but may be known to and used by one of ordinary skill in the computer software field. Examples of the computer program may include a high-level language code which may be executed using an interpreter or the like by a computer, as well as a machine language code such as that made by a complier.

The specific implementations described in the present disclosure are example embodiments and do not limit the scope of the present disclosure in any way. For brevity of the specification, descriptions of existing electronic components, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may be performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof.

At least one of the components, elements, modules or units (collectively "components" in this paragraph) represented by a block in the drawings, such as the controller 130, the controller 220, and the separation controller 170, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

INDUSTRIAL APPLICABILITY

An embodiment of the present disclosure may be used to manufacture a next-generation electronic cigarette including a cradle and a holder.

The invention claimed is:

1. A cradle to which a holder configured to receive an aerosol generating article is detachably attached, the cradle comprising:
   a cradle battery configured to supply electric power to a heater of the holder or a holder battery of the holder; and
   a cradle processor configured to:
      identify whether the holder is coupled to the cradle;
      based on an identification that the holder is coupled to the cradle, preheat the heater with the cradle battery,
      receive a temperature value of the heater of the holder from the holder,
      based on an identification that the temperature value of the heater of the holder reaches a preset temperature value by the preheating, separate the holder from the cradle, and
      control the holder battery of the holder to maintain the temperature value of the heater of the holder by heating using the holder battery of the holder.

2. The cradle of claim 1, wherein the cradle processor is configured to supply the electric power to charge the holder battery and to heat the heater by the charged holder battery, further based on an identification that the aerosol generating article is inserted into the holder.

3. An aerosol generating system comprising:
   a holder comprising:
   a heater configured to heat an aerosol generating article;
   a holder battery configured to supply electric power to the heater; and
   a holder processor configured to measure a charge value of the holder battery; and
   a cradle detachably coupled to the holder, the cradle comprising:
   a cradle battery; and
   a cradle processor configured to:
      identify whether the holder is coupled to the cradle,
      based on an identification that the holder is coupled to the cradle, preheat the heater with the cradle battery,
      receive a temperature value of the heater from the holder,
      based on an identification that the temperature value of the heater reaches a preset temperature value by the preheating, separate the holder from the cradle, and
      control the holder battery to maintain the temperature value of the heater by heating using the holder battery.

4. The aerosol generating system of claim 3, wherein the cradle processor is configured to supply the electric power to charge the holder battery and to heat the heater by the charged holder battery, further based on whether the aerosol generating article is inserted into the holder.

5. The aerosol generating system of claim 3, wherein the cradle processor is further configured to separate the holder from the cradle based on the received temperature value being greater than or equal to a preset reference temperature value.

6. A method performed by an aerosol generating system comprising a holder configured to receive an aerosol generating article and a cradle to which the holder is detachably attached, the method comprising:
- identifying whether the holder and the cradle are coupled;
- based on an identification that the holder and the cradle are coupled, preheating a heater of the holder with a cradle battery of the cradle;
- based on an identification that a temperature of the heater of the holder reaches a preset reference temperature value by the preheating, separating the holder from the cradle; and
- maintaining the temperature of the heater of the holder by heating using a holder battery of the holder.

7. The method of claim 6, further comprising:
- detecting whether a charge value of the holder battery is lower than a reference value;
- based on a detection that the charge value of the holder battery is lower than the reference value, charging the holder battery with the cradle battery by controlling the cradle battery; and
- based on a detection that the charge value of the holder battery is greater than or equal to the reference value, supplying electric power to the heater by controlling the cradle battery.

* * * * *